UNITED STATES PATENT OFFICE.

FREDERIC J. STAUNTON, OF MILWAUKEE, WISCONSIN.

PROCESS OF TREATING TEXTILE AND OTHER POROUS FABRICS.

1,108,408. Specification of Letters Patent. Patented Aug. 25, 1914.

No Drawing. Application filed July 30, 1913. Serial No. 782,104.

*To all whom it may concern:*

Be it known that I, FREDERIC J. STAUNTON, a citizen of the United States, residing at Milwaukee, in the county of Milwaukee and State of Wisconsin, have invented certain new and useful Improvements in Processes of Treating Textile and other Porous Fabrics, of which the following is a specification.

My invention consists of a liquid coating compound prepared from the following ingredients in substantially the proportions specified, and according to the following formulas: Formula No. 1: Lead pigment 32 per cent., linseed oil 8 per cent., varnish 4 per cent., turpentine 56 per cent. Formula No. 2: Zinc pigment 42 per cent., linseed oil 8 per cent., varnish 4 per cent., turpentine 46 per cent.

The foregoing compositions were discovered in endeavoring to find something to be used in deadening sounds in offices, halls, etc. Felt was placed against the wall and in front of this felt, and secured to strips or studding projecting beyond the felt, was stretched muslin, canvas, crash, or some other porous fabric or substance to allow sound to pass through and be absorbed by the felt. The object in stretching the porous substance or fabric in front of the felt was to provide a surface to receive a decorative finishing substance.

Various liquid materials for decorating or finishing the surface of the canvas, muslin, etc., such as paint, varnish, and calcimine have been tried, but it was found that they all filled up the pores of the surface so that the sound would not penetrate. This objectionable result is overcome by the use of my coating composition or compound which can be sprayed or put on with a brush over the outer surface of the canvas, muslin, or other suitable porous substance, which in drying, preserves the porosity of the material and allows both sound and air to pass through.

The compound may be colored to any tint and is capable of being washed upon becoming soiled, and it is possible to refinish the surface in the same manner if it is desired, without destroying the porosity of the fabric or substance.

The compound makes a thin liquid differing from paint, being more in the nature of a stain, drying so as to preserve the porous nature of the substance upon which it is applied, and producing a perfectly flat, soft, cloth-like finish, a result which is of great importance inasmuch as its principal object next to its porosity preserving purpose, is its use as a decorative finishing medium.

It is to be noted that the turpentine forms a large proportion of the compound, such proportion being absolutely essential in obtaining the requisite results as heretofore described. For, as the turpentine evaporates it open the pores of the substance to which it has been applied. The varnish and oil are binders to hold the lead or zinc to the fabric and to produce a serviceable and washable surface.

I have given my preferred formulas, but it is evident that various substitutes for the several ingredients may be used if desired. For instance, the lead pigment used is commercial carbonate, sulfate, or oxid of lead, or any suitable substitute of any one of them. China wood oil may be used in place of the linseed oil, while benzin, gasolene, lithofoam, the latter a substitute now on the market to take the place of turpentine, or any other thinning material may be used in place of the turpentine. The zinc pigment is oxid of zinc or a substitute form and the varnish commercial oil varnish or its equivalent. The lead and the zinc or their substitutes above given form the base pigment or body for my composition, and in the appended claims I find it convenient to use the term "base pigment." By this term I mean to convey the idea that the said pigment forms a base or body for the compound being of a sufficient percentage of the whole for such purpose, and that it is not a mere coloring agent.

I do not wish to confine myself to the proportions as given in my formulas herein set forth, as they may be changed somewhat and yet produce substantially similar results. The foregoing formulas are particularly suitable for ordinary temperate climates as has been proven in actual practice; but the percentage of ingredients may undoubtedly be advantageously changed to meet the requirements of different temperatures and climates.

It is a well known fact that lead and zinc pigments, linseed oil, varnish, and turpentine are extensively used in the manufacture of paints and other liquid coatings, and that turpentine is used as a thinning agency in the art; but applicant is not aware and does not believe that a compound consisting of a suitable pigment, a suitable binding medium of one or more materials, combined with a large proportion of a suitable thinning material, has ever before been in practical use; and particularly it is not believed that the results obtained by its use as herein set forth have heretofore been discovered.

I claim:

The process of treating textile and other porous fabrics whereby the porous nature thereof is retained and preserved, consisting of applying thereto a liquid compound composed of a base pigment, and a binding medium for the pigment, combined with an amount of thinning material of not less than thirty-two per cent. of the entire compound.

In testimony whereof I affix my signature in presence of two witnesses.

FREDERIC J. STAUNTON.

Witnesses:
C. W. REEDER,
CHAS. C. RUSSELL.